United States Patent [19]

Rieleit

[11] Patent Number: 5,102,071

[45] Date of Patent: Apr. 7, 1992

[54] VEHICLE, ESPECIALLY AIR OR WATER VEHICLE

[76] Inventor: Peter Rieleit, Bankstrasse 49, D-4000 Düsseldorf 30, Fed. Rep. of Germany

[21] Appl. No.: 604,768

[22] Filed: Oct. 26, 1990

[30] Foreign Application Priority Data

Oct. 27, 1989 [DE] Fed. Rep. of Germany .... 3935886.0
Jan. 11, 1990 [DE] Fed. Rep. of Germany ....... 4000596

[51] Int. Cl.$^5$ .................................... B64D 17/14
[52] U.S. Cl. .................... 244/152; 244/902; 244/142; 244/153 R
[58] Field of Search ............... 244/902, 900, 904, 142, 244/152, 145, 153 R

[56] References Cited

U.S. PATENT DOCUMENTS

| | | | |
|---|---|---|---|
| 3,285,546 | 11/1966 | Jalbert | 244/902 X |
| 3,428,277 | 2/1969 | Everett, Jr. | 244/902 X |
| 4,175,722 | 11/1979 | Higgins | 244/902 X |

FOREIGN PATENT DOCUMENTS

| | | |
|---|---|---|
| 2423795 | 1/1975 | Fed. Rep. of Germany . |
| 3707463 | 10/1987 | Fed. Rep. of Germany . |
| 8713293 | 6/1988 | Fed. Rep. of Germany . |
| 3709515 | 10/1988 | Fed. Rep. of Germany . |
| 8811274 | 1/1989 | Fed. Rep. of Germany . |
| 3804892 | 6/1989 | Fed. Rep. of Germany . |
| 3903779 | 8/1990 | Fed. Rep. of Germany . |
| 1396654 | 3/1965 | France . |
| 2558791 | 8/1985 | France . |
| 2615164 | 11/1988 | France .............................. 244/904 |
| 8900599 | 5/1990 | France . |
| 1086126 | 10/1967 | United Kingdom . |

Primary Examiner—Joseph F. Peters, Jr.
Assistant Examiner—Christopher P. Ellis
Attorney, Agent, or Firm—Marmorek, Guttman & Rubenstein

[57] ABSTRACT

A vehicle, especially an air vehicle or water vehicle, is described which has at least one wing. This wing includes an upper and/or a lower wing covering as well as an area provided at the wing which is movable between a first position in which the air or water resistance of the wing is small and a second position in which the air or water resistance is increased. Furthermore, an actuation mechanism in engagement with the area for carrying out the movement is provided. The area is formed as deformable area and defines a portion of the upper and/or lower wing covering.

20 Claims, 5 Drawing Sheets

VEHICLE, ESPECIALLY AIR OR WATER VEHICLE

The present invention concerns a vehicle, especially an air or water vehicle, having a wing having an area which is movable between a first position in which the air or water resistance of the wing is small and a second position in which the air or water resistance is enlarged.

Air vehicles, as for instance aircrafts, ultra-light aircrafts, kites, sliders, parachutes etc. have at least one wing in order to generate the necessary ascending force or to brake the free fall to the necessary extent with parachutes. Furthermore, it is also known with water vehicles, as for instance hydrofoils, to provide carrying wings at the body in order to lift the body of the water vehicle at least partly out of the water and to decrease the frictional resistance thereby.

In order to enable steering of these vehicles having at least one wing into a certain direction, the wings of the vehicles have areas which are movable between a first position in which the air or water resistance of the wing is small and a second position in which the air or water resistance is enlarged. With aircrafts, for instance, these areas are formed by flaps which, in the direction of flight, are provided at the rear edge of the wing and can be pivoted out of the plane of the wing for increasing the air resistance. The aircraft is braked on one side by such an increased resistance so that it turns around and becomes steerable thereby. The steering of water vehicles provided with wings is based upon the same principle, as this is, for instance, in the case of hydrofoils or submarines.

Furthermore, it is known in connection with certain types of kites, the so-called parafoil-kites e.g., or sliders, to change the entire form of the wings for increasing the air resistance and thus for steering the flight direction. For instance, with parafoil-kites, according to the above-described principle of flaps, the rear end of the parafoil-kite consisting of the wing is pivoted so that such a wing deformed over its half has a correspondingly higher air resistance.

German utility model 88 11 274 describes a directional steering for parafoil-kites. The kite consists of a wing, and on each side of the wing a system of balance ropes is provided so that, if one of these systems of balance ropes is placed under tension, the position of this wing side placed under tension is changed whereby the air resistance is correspondingly increased and the change of direction is realized.

The present invention is based upon the problem to provide a vehicle of the cited kind which is steerable in an especially simple manner.

According to the invention, this problem is solved by a vehicle which is an air or water vehicle having at least one wing which includes and upper and/or lower wing covering as well as an area provided at the wing which is movable between a first position in which the air or water resistance of the wing is small and a second position in which the air or water resistance of the wing is enlarged. An actuation means is provided which engages the area and which causes the above-cited movement of the area. The area is formed as deformable area and defines a portion of the upper and/or lower wing covering, i. e. the area is formed such that it is disposed in the plane of the wing covering in its first position so that hereby the air or water resistance of the wing is correspondingly small and is not changed. However, in the second position this area projects linearly or preferably areally from the plane of the wing coverings so that the air or water resistance of the wing, for instance by break-away of the flow profile or occurence of turbulences, is enlarged whereby the desired change of direction of the vehicle is realized.

The inventive vehicle has a number of advantages. For instance, an air or water vehicle provided with such a wing has only a small number of components and is steerable in an especially good manner since, in the simplest case, it is only necessary to design the corresponding area resiliently deformable so that this area, in its first position, is disposed within the plane of the wing covering and can be transfered into the second position by a simple deformation of the corresponding area, for instance in a hydraulic and/or mechanical manner. The degree of deformation can be adjusted especially well so that the vehicle can be steered especially precisely. This is especially true if the wing has a plurality of correspondingly deformable areas which can be moved between the first and second position commonly or preferably separately. Accordingly, such a wing is especially suited for air vehicles having a light-weight construction, as this is for instance the case for ultra-light aircrafts, sliding parafoils, steerable kites as well as the above-described parafoil-kites.

An especially suited embodiment of the inventive vehicle has the feature that the wing includes a plurality of deformable areas which can be moved preferably independently from the first position into the second position. Hereby, it is achieved in an especially simple manner that the vehicle can be steered very precisely at a change of direction since the air or water resistance can be increased or decreased especially precisely and finely on account of a different number or a different degree of deformation of the deformable areas.

According to a further embodiment of the inventive vehicle only the upper wing covering is provided with the deformable area or the above-described plurality of deformable areas. Such an embodiment is especially suited for cases according to which the actuation means is located within the wings and is formed such that it pulls the deformable area in a frustroconical manner into the wing by mechanical tension so that corresponding recesses are formed on the upper wing covering. The flow resistance of the wing is increased by these recesses, for instance by the formation of corresponding turbulence zones, so that corresponding forces act upon the wing and thus on the vehicle which have the effect of a turning of the vehicle.

In principle, a deformable area can be provided at different locations on the wing covering. Especially large changes of the air or water resistance are achieved by the feature that the deformable area or the plurality of deformable areas are provided in a forward portion of the wing covering since hereby the flow profile is changed directly whereby a corresponding ascending force and a corresponding enlargement of the air or water resistance can be achieved.

The size of the deformable area or of the plurality of deformable areas depends on the desired enlargement of the air or water resistance and thus also on the change of direction which is to be achieved. The deformable area or the plurality of deformable areas covers an area which is about 10% up to about 80%, preferably about 20% up to about 40%, of the surface of the wing covering.

An especially fast and finely adjusted change of direction is achieved with such air vehicles according to which the wing has a flexible construction, especially a bar-free construction. Here, the wing comprises air chambers open on one side or is exclusively formed by these air chambers open on one side in the forward portion of the wing in flight direction, especially adjacent to or at the front edge. According to this embodiment the wing covering, which consists for instance of the known spinnalrer fabrics, can be moved in the zones of the deformable areas between the first position and the second position especially easily, for instance by applying small tension by corresponding cords.

In order to optimize the flow characteristics of the above-cited embodiment of an air vehicle having such a wing, which is especially a parafoil-slider or a parafoil-kite, another embodiment has the feature that the air chambers which are open on one side have additional walls in the range of their openings which, however, do not extend over the complete length of the air chambers. By this feature the opening of each air chamber is further divided in a chamber-like manner. The formed chambers are also open at their rear ends and open into the true air chamber, as further described in the following in connection with the concrete examples.

The additional walls extend over about 10% up to about 40%, preferably over about 20% up to about 30%, of the depth of the air chambers and are also open at their rear end, as already described.

The terminating edge of the additional wall is arcuately curved, preferably formed concave in the direction of flight, in order to prevent a high load and in connection therewith a possible tearing out of this additional wall which connects the upper and lower wing covering.

In principle, the actuation means for the deformable area can be located anywhere on the wing of the inventive vehicle. According to a preferred embodiment, the actuation means is provided within the wing so that the flow conditions on the wing are not changed by the actuation means itself and thus no additional resistance is caused hereby.

As already mentioned above, the actuation means for the deformable area can be, for instance, a mechanical, hydraulic or pneumatic actuation means. It is advantageous for slide parafoils, ultra-light aircrafts or parafoil kites to design the actuation means such that the deformable area is moved into the second position by a tensional load. In the simplest case this can be achieved by fastening the balance ropes known per se at the deformable area in a point-litre manner so that the deformable area is moved into the second position through a tensional load. Furthermore, it is possible to provide keels, made for instance from fabric, instead of the balance ropes which act in a corresponding linear manner and move the deformable area into the second position. Of course, it is possible to provide more than one actuation means per deformable area so that, for instance, two keels or a corresponding number of balance ropes are present.

According to an especially preferred embodiment of the inventive vehicle the vehicle is designed as steerable kite. This kite has preferably only one flexible and bar-free wing and is thus a parafoil-kite. A number of deformable areas, for instance between about 5 and about 20, are provided on this wing in the forward portion thereof, while the actuation means has a number of balance ropes that corresponds to the number of the deformable areas. With regard to the longitudinal direction of the wing these balance ropes are provided in two symmetrical systems. Each system of balance ropes is connected to a steering cord so that the user controls this kite by means of these two steering cords. According to a tensional load of one of the two steering cords the corresponding system of balance ropes is also tensioned, while the other side is relieved of the load, whereby the deformable areas connected therewith are transferred from the first position into the second position so that the air resistance at the corresponding wing portion is enlarged. This, however, has the effect that the flight direction of the parafoil-kite changes towards that side at which the two deformable areas are in the second position.

An especially good and precised steering as well as an excellent ascending performance of the above-described embodiment of the inventive vehicle is achieved by the feature that each of the balance ropes of each system has a different length. Preferably, the length of the balance ropes changes from the outside to the inside, viewed in transverse direction the wing, in a ratio of 71:70:75:86:100.

According to a further embodiment of the inventive vehicle which is a two-rope steerable parafoil-kite a plurality of air chambers is located on the wing. Each chamber has at least one first opening in the forward portion of the wing, especially at the front edge of the wing. In at least one of the chambers of the wing a second opening is provided, wherein, according to a preferred embodiment, each chamber has this second opening. The second opening has the effect that a constant air pressure is maintained in the chambers, even with extremely strong wind, so that the chambers maintain their geometrical shape and thus an increasing speed is achieved while damage to the chamber walls is avoided. Furthermore, it is achieved by the provision of the second opening that the steerable kite can fly in a pulsation-free and vibration-free manner. Furthermore, the second opening at each chamber facilitates the cleaning of the chamber from contaminations, as for instance water, sand, dust etc. Moreover, the second opening at each chamber enables the wing to be ventilated by a sudden impact, for instance on the ground, so that the compressed air in the chamber can escape through the second opening and damage to the chamber is prevented thereby.

According to a very preferred embodiment the second opening is disposed at the rear edge of the wing.

An especially preferred embodiment of the inventive vehicle has the feature that the second opening opens only at a certain air pressure in the chamber. This can be achieved, for instance, by providing a second opening the edge of which being provided with a resilient member, for instance a resilient wire. The chamber bulges in a different manner in response to the inner pressure which is present, whereby different forces act on the resilient member which has the result of a different opening degree of the second opening. A further embodiment of a second opening which opens in response to the inner pressure in the chamber is described in the following in connection with the examples.

Improvements of the inventive vehicle are described below.

In the following the inventive vehicle is described in connection with different examples and with the drawing. Of the drawings, FIG. 1 shows a perspective view of a vehicle which is designed as parafoil-kite;

Figure 1:
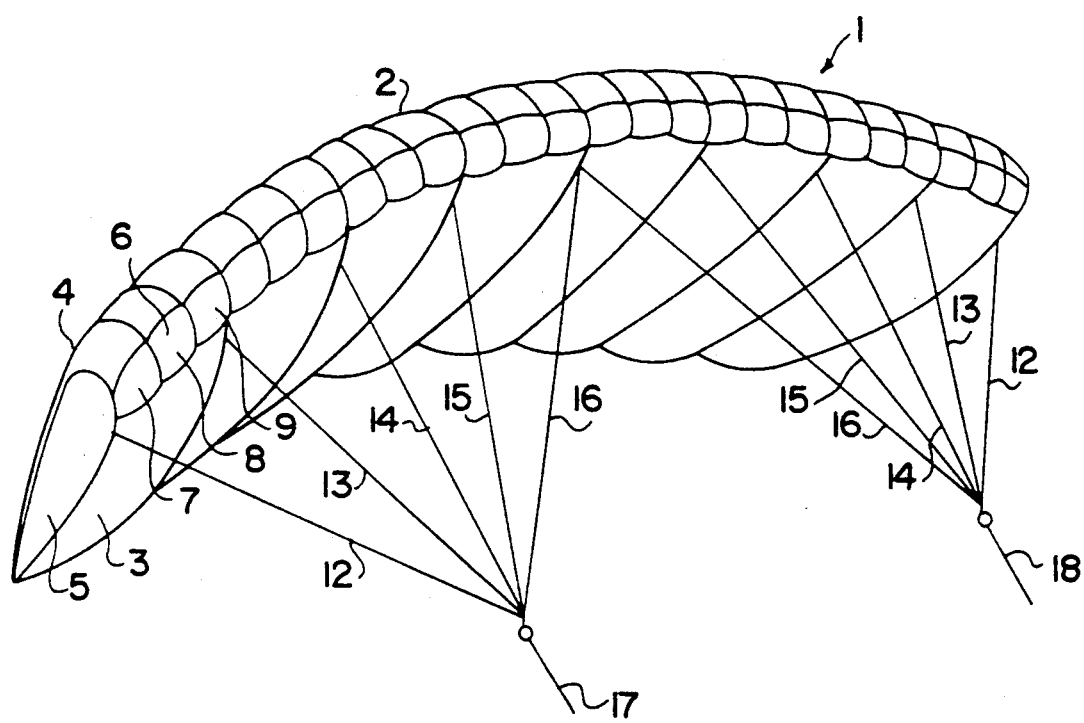
Figure 2:
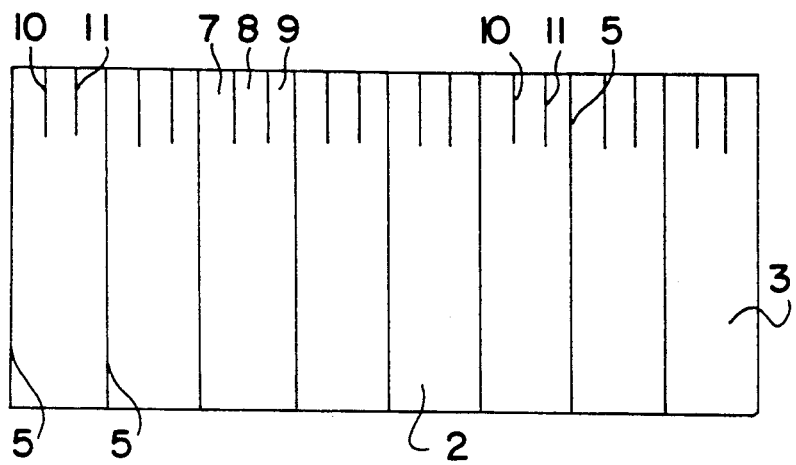
FIG. 2 shows a diagrammatic top view of the parafoil-kite according to FIG. 1 with removed upper wing covering.

FIG. 1 shows an air vehicle designated with 1 which is a parafoil-kite. The air vehicle includes a single wing 2 having a flexible construction. This construction is completely free of reinforcing struts. The reinforcement of the wing 2 necessary for the flight operation is rather achieved by connection of the lower wing covering 3 and of the upper wing covering 4 under formation of eight chambers, wherein a corresponding number of walls 5 extend between the upper wing covering 4 and the lower wing covering 3. These chambers are filled with air by the dynamic pressure. This air has a higher air pressure than the pressure of the outer air and gives the wing the real shape. The chambers have air inlet openings 6 in the portion of the front edge of the wing 2. Furthermore, each air chamber is divided by additional intermediate walls in the range of the inlet opening 6 such that the embodiment shown in FIG. 1 has three inlet openings 7, 8 and 9 per air chamber. In order to achieve this division additional walls 10 and 11 are provided which, however, do not extend over the entire depth of the wing 2, as this is particularly shown in FIG. 2.

On each side of the wing 2 five balance ropes 12 to 16 are provided, respectively, for the steering of the parafoil-kite. The five balance ropes define a corresponding system. A steering cord 17 or 18 is located at each system of balance ropes. Preferably, the lengths of the ropes 12, 13, 14, 15, 16 within each system have a ratio of 71:70:75:86:100.

In the upper portion each balance rope branches in a V-shaped manner. The branches are led through the lower wing covering 3 and act with their ends at the deformable areas 19 to 21 (FIG. 3) of the upper wing covering 4.

Figure 3:
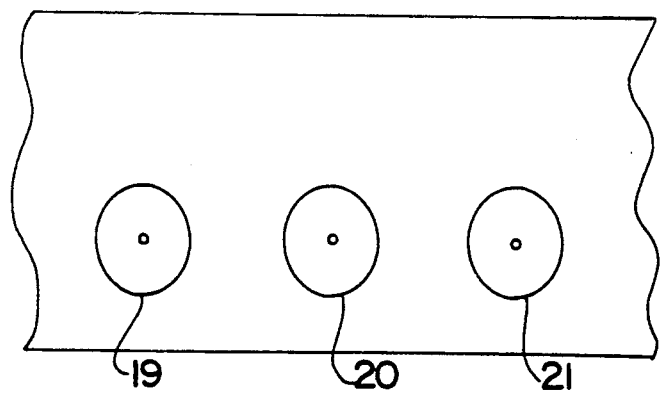
FIG. 3 shows a diagrammatic top view of the upper wing covering.

According to the desired change of direction, one of the two steering cords 17 or 18 is pulled for the steering. This tension is continued through the corresponding system of balance ropes 12 to 16 to the corresponding deformable areas 19 to 21 so that the deformable areas are areally or linearly deformed, as this is shown in FIG. 3. The air resistance of the respective wing half changes by this transfer of the deformable areas 19 to 21 into the second position so that the air vehicle is turned clockwise into the corresponding direction and the desired change of direction is achieved. Upon relieving of the tension the deformable areas go back into their initial position (first position) so that the air resistance is again reduced and thus the two wing halfs have again the same air resistance. This has the effect that the air vehicle flies straight on.

In FIGS. 4 to 7 various embodiments of a wing 2 are shown in sectional views. Each of the shown embodiments has a lower wing covering 3, an upper wing covering 4, a wall 5, an air inlet opening 6, an additional wall 10 as well as a balance rope 12 which acts on the deformable area 19 or 19a and 19b. The shown embodiments differ from one another only by the feature that this engagement of the balance rope 12 is differently designed and that the deformable area 19 is located either at the upper or the lower wing covering.

Figure 4:
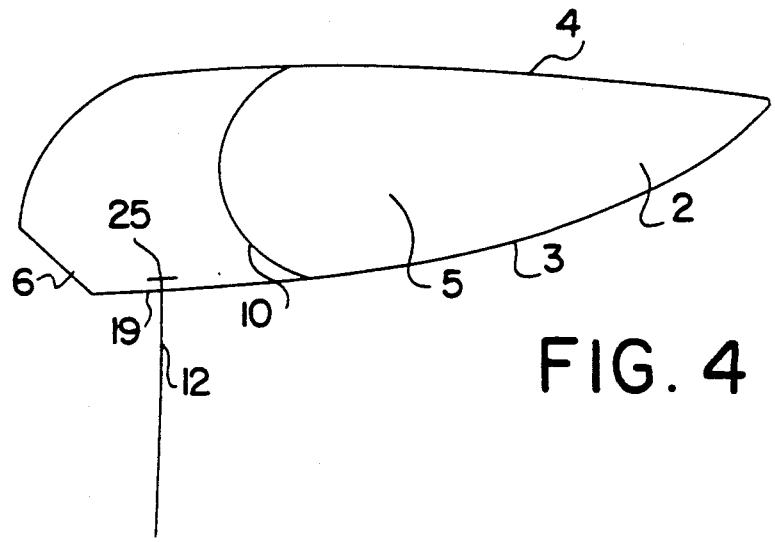
FIGS. 4-9 show sectional views of four embodiments of a wing.

According to the embodiment shown in FIG. 4 the deformable area 19 is situated at the lower wing covering 3. The balance rope 12 is led through the lower wing covering 3 and has at its end a locking member 25 which, in the simplest case, consists of a disc member, in order to achieve the above-described movement of the deformable area between the first and the second position.

Figure 5:
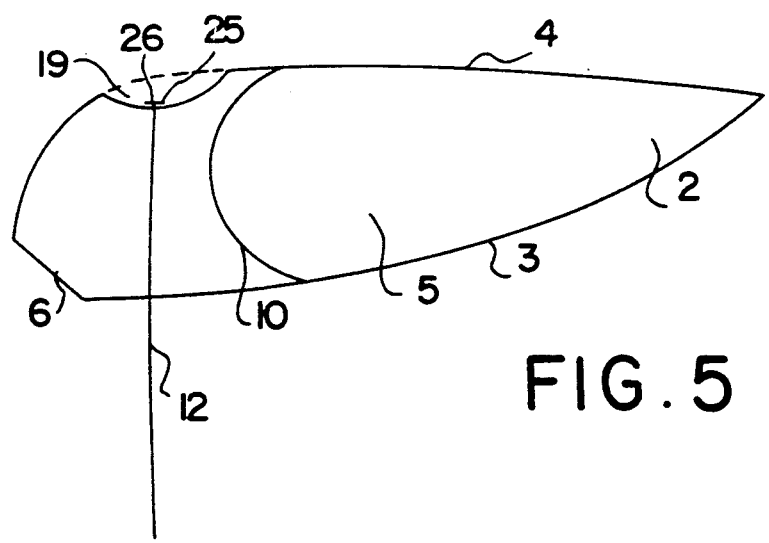

According to FIG. 5, which shows the deformable area 19 in its second position, the balance rope 12 is led through the lower wing covering 3 as well as through the upper covering 4 and has also the above-described locking member 25. Upon relief of the load of the balance rope 12 the deformable area moves in the direction of the arrow 26, i. e. in the direction towards the first position so that, upon complete relief of the balance rope, the deformable area has a position as shown in FIG. 5 by the dotted line.

Figure 6:
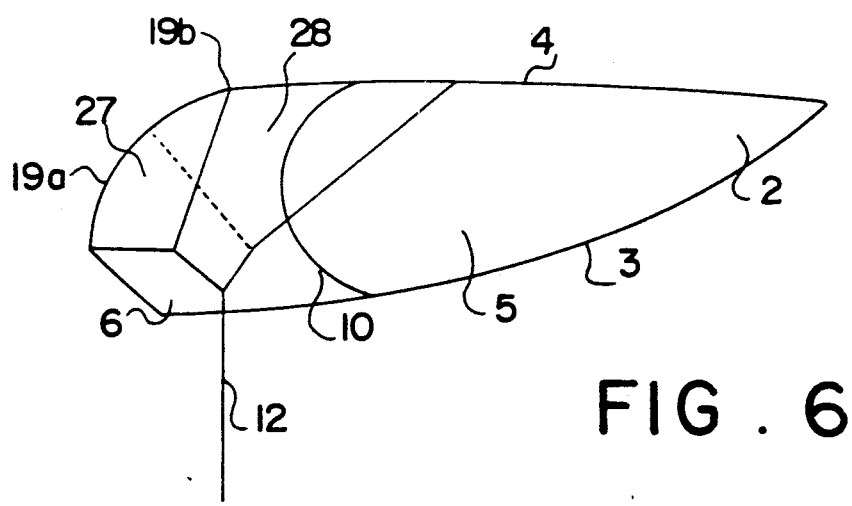

According to the embodiment shown in FIG. 6 the balance rope 12 is also led through the lower wing covering 3 and branches within the air chamber in a V-like manner. Two keels 27 and 28 are provided at the end of the V-like branches. The keels each act on a deformable area 19a and 19b of the upper wing covering 4. Accordingly, upon tensioning of the balance rope 12 two depressions (second position of the deformable area) occur in the upper wing covering so that the air resistance is further increased.

Figure 7:
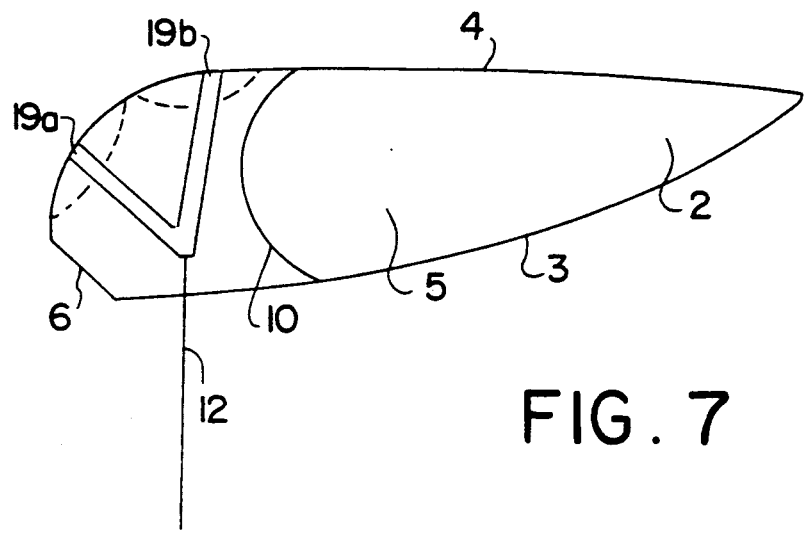

Also the embodiment shown in FIG. 7 has two deformable areas 19a, 19b which are both associated with the upper wing covering 4 of the wing 2. The balance rope 12 is led through the lower wing covering 3 and is freely movable with regard to the lower wing covering 3, as this is the case with all the above-described embodiments. Upon pulling the balance rope 12 the force is transferred to a V-shaped fabric strip on the two deformable areas 19a and 19b so that these two deformable areas are transferred into the second position which is indicated by the dotted lines. In this manner the air resistance at the upper wing covering 4 is correspondingly increased.

As one can clearly recognize with the above-described embodiments shown in FIGS. 4 to 9, the additional wall 10 is concavely curved at its terminating edge. By this feature this edge is prevented from being torn from its attachment with the upper and lower wing covering if high loads occur. The additional wall 11 is formed in the same manner as the additional wall 10.

Figure 8:
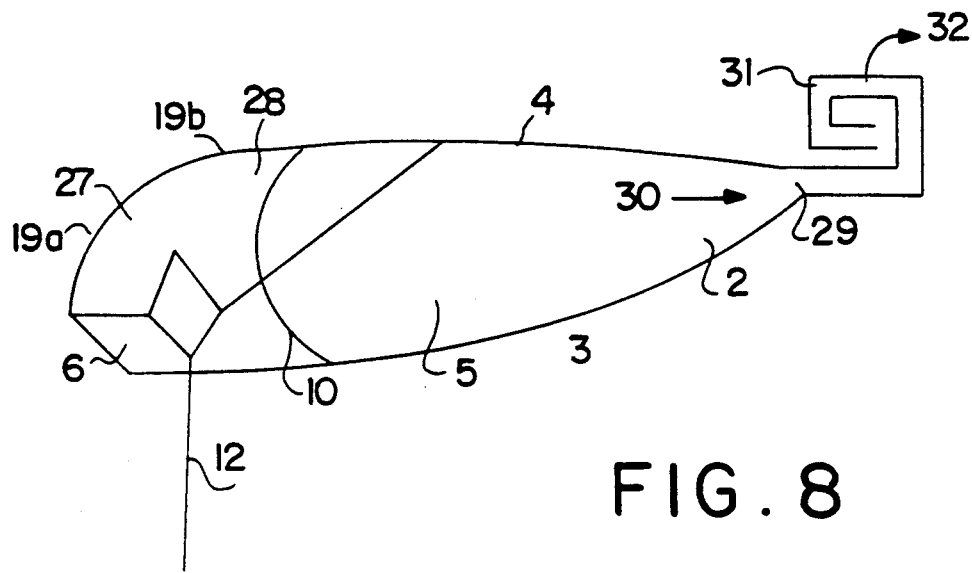
Figure 9:
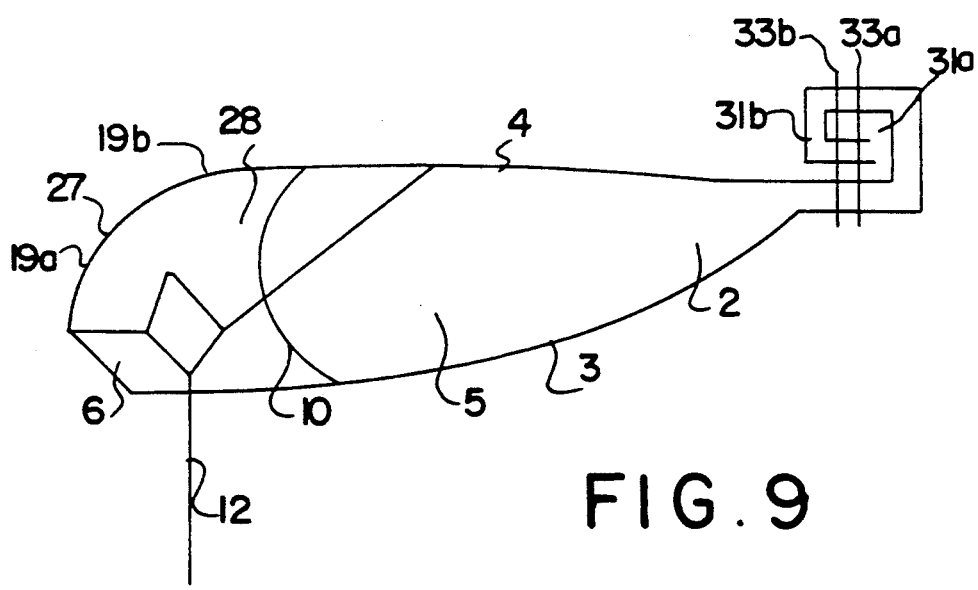

The further embodiment of the wing 2 shown in FIGS. 8 and 9 has, as the above-described wings, an upper wing covering and a lower wing covering 3. The wall 5 extends between the upper wing covering 4 and the lower wing covering 3 so that the wing 2 has a plurality of air chambers which are divided by the walls 5, as this was also described in principle for the embodiment shown in FIG. 1. At least one first air inlet opening 6 for each chamber is provided in the range of the front edge of the wing 2. This air inlet opening is divided into three air inlet openings by intermediate walls which are not shown, as this was already described above. The wing 2 has a funnel-like and angled second opening 29 at the rear edge. The air entering into the air inlet opening 6 can flow out through this second opening 29, as this is shown by the arrow 30. Upon increasing pressure in the chamber the portion 31 of the funnel-like opening 29 moves in the direction of the arrow 32 whereby the flow rate through the opening 29 is enlarged. By this, it is achieved that always a constant air pressure is in the chamber. With decreasing air pressure the portion 31 is moved back in the opposite direction of the arrow 32 into the shape shown in FIG. 8. This backward movement of the portion 31 of the funnel-like opening 29 is realized by sewing adjacent edge portions in such a manner as shown in FIG. 9. Here, the rear portions 33a and 33b of the upper or lower wing covering are folded twice and are provided with a double seam, as this is shown by the lines 33a and 33b in an enlarged and expanded scale.

I claim:

1. A steerable kite having a wing, comprising
   an upper wing covering and a lower wing covering,
   at least one air chamber disposed between said upper wing covering and said lower wing covering, said air chamber having an opening at a forward portion of said wing,
   said wing including a leading edge and a plurality of areas located on a surface at a forward portion of one of said wing coverings, said areas being located a distance from said leading edge and covering an area approximately 20 to 40 percent of a surface area of one of said wing coverings; said areas being areally deformable between a first position in which the air resistance of said wing is small and a second position in which the area resistance of said wing is enlarged, and
   actuating means engaged to said areas for areally deforming said areas into said first and second positions.

2. The steerable kite of claim 1 wherein said actuating means comprises a plurality of balancing ropes, the number of said balancing ropes corresponding to the number of deformable areas, said balancing ropes forming at least two symmetrical systems, each system being connected to a steering cord.

3. The steerable kite of claim 1 wherein said deformable areas are located on a surface of said upper wing covering.

4. The steerable kite of claim 1 wherein said deformable areas are located on a surface of said lower wing covering.

5. The kite of claim 1 wherein said deformable areas comprise about 10% to about 80% of said surface.

6. The kite of claim 1 further comprising at least one wall located at said opening of said air chamber and extending partly into said air chamber, thereby dividing said air chamber into a plurality of sub-chambers.

7. The kite of claim 6 wherein said wall extends along about 10% to about 40% of the depth of said air chamber.

8. The kite of claim 6 wherein said wall has an arcuately curved terminating edge.

9. The kite of claim 1 wherein said actuating means is located within said wing.

10. The kite of claim 1 wherein said actuating means is engaged to said areas at a point located within said areas.

11. The kite of claim 1 wherein said actuating means is engaged to said areas along a line located within said areas.

12. The kite of claim 2 wherein each of said systems comprises between 2 and 100 balance ropes.

13. The kite of claim 2 wherein each of the balance ropes within each of said systems is of a different length.

14. The kite of claim 13 wherein each of said systems comprises 5 balance ropes, the length of each balance rope within one of said systems from an outer wing edge to a center of said wing being in the ratio of 71:70:75:86:100.

15. The kite of claim 2 wherein a respective inner balance rope of each system is in engagement with the same deformable area.

16. The kite of claim 2 wherein said wing comprises a plurality of air chambers, each air chamber having at least one first opening in a forward portion of said wing, said plurality of air chambers including a second opening at at least one of said air chambers.

17. The kite of claim 16 wherein said first opening of each of said air chambers is located at a front edge of said wing.

18. The kite of claim 16 wherein said second opening is located at a rear portion of said wing.

19. The kite of claim 16 wherein said second opening is located at a rear edge of said wing.

20. The kite of claim 16 wherein said second opening is normally closed and opens only when a predetermined air pressure is present in said chamber.

* * * * *